United States Patent
Chen et al.

(10) Patent No.: US 12,177,125 B2
(45) Date of Patent: Dec. 24, 2024

(54) METHOD, APPARATUS AND DEVICE FOR CONTROLLING TRAFFIC LIMITATION AND STORAGE MEDIUM

(71) Applicant: CHINA UNIONPAY CO., LTD., Pudong New Area Shanghai (CN)

(72) Inventors: Lin Chen, Pudong New Area Shanghai (CN); Zan Sheng, Pudong New Area Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/682,057

(22) PCT Filed: Mar. 2, 2022

(86) PCT No.: PCT/CN2022/078759
§ 371 (c)(1),
(2) Date: Feb. 8, 2024

(87) PCT Pub. No.: WO2023/015869
PCT Pub. Date: Feb. 16, 2023

(65) Prior Publication Data
US 2024/0267331 A1      Aug. 8, 2024

(30) Foreign Application Priority Data

Aug. 10, 2021   (CN) .......................... 202110913583.7

(51) Int. Cl.
*H04L 47/12*       (2022.01)
*H04L 47/11*       (2022.01)

(52) U.S. Cl.
CPC .............. *H04L 47/12* (2013.01); *H04L 47/11* (2013.01)

(58) Field of Classification Search
None
See application file for complete search history.

(56) References Cited

U.S. PATENT DOCUMENTS

| 6,035,333 A | 3/2000 | Jeffries et al. |
| 10,164,889 B1 | 12/2018 | Li et al. |

(Continued)

FOREIGN PATENT DOCUMENTS

| CN | 105245463 A | 1/2016 |
| CN | 108073465 A | 5/2018 |

(Continued)

OTHER PUBLICATIONS

CNIPA; Notification to Grant Patent Right for Invention for Chinese Patent Application No. 202110913583.7 dated Jun. 8, 2023, 7 pages.

(Continued)

*Primary Examiner* — Andre Tacdiran
(74) *Attorney, Agent, or Firm* — K&L Gates LLP

(57) ABSTRACT

The present application discloses a method, an apparatus, a device for controlling traffic limitation and a storage medium, and belongs to the field of data processing. The method for controlling traffic limitation includes: acquiring, in response to a present request, a first timestamp of the present request; acquiring a pre-created traffic limitation instance, the traffic limitation instance including N storage blocks, a total number of instance requests, a traffic limitation request threshold number, an identifier of a storage block for a previous request, a second timestamp of the previous request and request waiting time; updating the traffic limitation instance based on a time interval between the first timestamp and the second timestamp, the unit time length, and the traffic limitation request threshold number; and determining whether to perform traffic limitation based on the request waiting time in the updated traffic limitation instance.

17 Claims, 6 Drawing Sheets

(56) References Cited

U.S. PATENT DOCUMENTS

| | | | |
|---|---|---|---|
| 2009/0193141 A1 | 7/2009 | Suresh | |
| 2012/0317616 A1* | 12/2012 | Kim | H04L 63/1458 726/22 |
| 2014/0033019 A1* | 1/2014 | Zhang | G06F 16/986 715/234 |
| 2024/0013270 A1* | 1/2024 | Peddinti | G06Q 30/0609 |

FOREIGN PATENT DOCUMENTS

| | | |
|---|---|---|
| CN | 111142942 A | 5/2020 |
| CN | 111431813 A | 7/2020 |
| CN | 111953772 A | 11/2020 |
| CN | 112350953 A | 2/2021 |
| CN | 112702228 A | 4/2021 |
| CN | 113037862 A | 6/2021 |
| CN | 113079106 A | 7/2021 |
| CN | 113220723 A | 8/2021 |
| CN | 113691457 A | 11/2021 |
| WO | 2019174509 A1 | 9/2019 |
| WO | 2020034135 A1 | 2/2020 |
| WO | 2021068205 A1 | 4/2021 |

OTHER PUBLICATIONS

CNIPA; Translation of International Search Report for International Patent Application No. PCT/CN2022/078759 dated May 18, 2022, 6 pages.
CNIPA; Written Opinion for International Patent Application No. PCT/CN2022/078759 dated May 18, 2022, 7 pages.

* cited by examiner

| Storage blocks: | 7 | 6 | 0 | 0 | ...... | 0 | 0 |
|---|---|---|---|---|---|---|---|
| | 1 | 2 | 3 | 4 | | N-1 | N |

Index of storage block for previous request: 2

Total number of instance requests: 13

Traffic Limitation request threshold number: 200

Second timestamp: tv_sec: 1622471313
tv_usec: 21214

Request waiting time: 0

Fig. 3

METHOD, APPARATUS AND DEVICE FOR CONTROLLING TRAFFIC LIMITATION AND STORAGE MEDIUM

CROSS-REFERENCE TO RELATED APPLICATION

The application is a National Stage of International Application No. PCT/CN2022/078759 filed on Mar. 2, 2022, which claims priority to Chinese Patent Application No. 202110913583.7, filed on Aug. 10, 2021, and entitled "METHOD, APPARATUS AND DEVICE FOR CONTROLLING TRAFFIC LIMITATION AND STORAGE MEDIUM", both of which are hereby incorporated by reference in their entireties.

TECHNICAL FIELD

The present application belongs to the field of data processing, and in particular relates to a method, an apparatus and a device for controlling traffic limitation and a storage medium.

BACKGROUND

With popularity of network technology, users in a network are increasing gradually. Correspondingly, requests sent or received by the users in the network are also increasing.

In order to ensure stability and robustness of an application, a network system, and the like, there is necessary to perform traffic limitation on the requests to prevent congestion during traffic processing. Traditionally, a counter may be used to count within a time window, and under a condition that a number countered by the counter within the time window exceeds a traffic limitation threshold, a request is rejected.

However, the traditional control for traffic limitation on requests is coarse and is inaccurate, thereby reducing effects of the traffic limitation.

SUMMARY

In a first aspect, the embodiments of the present application provide a method for controlling traffic limitation, including: acquiring, in response to a present request, a first timestamp of the present request: acquiring a pre-created traffic limitation instance, the traffic limitation instance including N storage blocks, a total number of instance requests, a traffic limitation request threshold number, an identifier of a storage block for a previous request, a second timestamp of the previous request and request waiting time, wherein the N storage blocks correspond to N sub-time segments which are formed by dividing a pre-set unit time length respectively, where N is an integer greater than 1, and each of the storage blocks stores a number of requests within the respective sub-time segment corresponding to the storage block, and the total number of instance requests is a sum of respective numbers of requests stored in the respective storage blocks: updating the traffic limitation instance based on a time interval between the first timestamp and the second timestamp, the unit time length and the traffic limitation request threshold number; and determining whether to perform traffic limitation based on the request waiting time in the updated traffic limitation instance.

In a second aspect, the embodiments of the present application provide an apparatus for controlling traffic limitation, including: an acquisition module configured to acquire, in response to a present request, a first timestamp of the present request, and acquire a pre-created traffic limitation instance, the traffic limitation instance including N storage blocks, a total number of instance requests, a traffic limitation request threshold number, an identifier of a storage block for a previous request, a second timestamp of the previous request and request waiting time, wherein the N storage blocks correspond to N sub-time segments which are formed by dividing a pre-set unit time length respectively, where N is an integer greater than 1, and each of the storage blocks stores a number of requests within the respective sub-time segment corresponding to the storage block, and the total number of instance requests is a sum of respective numbers of requests stored in the respective storage blocks: a processing module configured to update the traffic limitation instance based on a time interval between the first timestamp and the second timestamp, the unit time length and the traffic limitation request threshold number; and a traffic limitation module configured to determine whether to perform traffic limitation based on the request waiting time in the updated traffic limitation instance.

In a third aspect, the embodiments of the present application provide a device for controlling traffic limitation including a processor and a memory storing computer program instructions, wherein the processor is configured to execute the computer program instructions to implement the method for controlling traffic limitation according to the first aspect.

In a fourth aspect, the embodiments of the present application provide a computer-readable storage medium, storing computer program instructions, which, when executed by a processor, implement the method for controlling traffic limitation according to the first aspect.

BRIEF DESCRIPTION OF THE DRAWINGS

In order to illustrate technical solutions of embodiments of the present application more clearly, the drawings required for the embodiments of the present application will be briefly described. For a person skilled in the art, other drawings can also be obtained from these drawings without any inventive efforts.

FIG. 3 is a schematic view of an example of constituent elements of a traffic limitation instance according to an embodiment of the present application:

DETAILED DESCRIPTION

Figure 1:
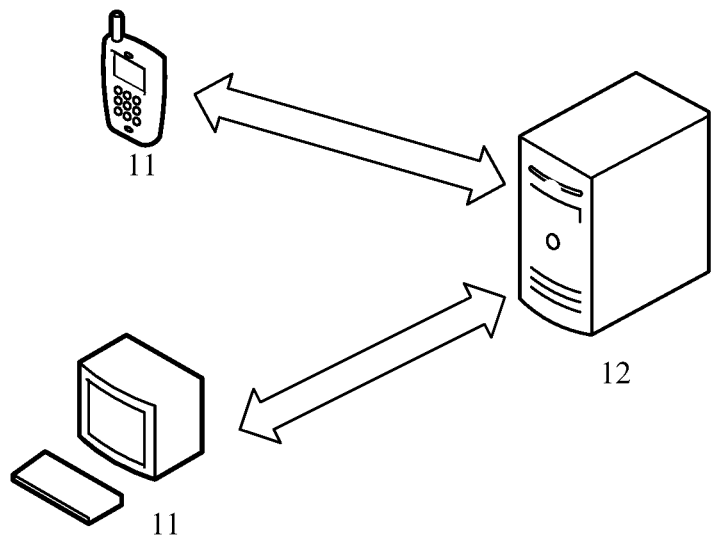
FIG. 1 is a schematic view of an application scenario of an example of a method for controlling traffic limitation according to embodiments of the present application.

Features and exemplary embodiments of various aspects of the present application will be described in detail below. In order to make the objects, technical solutions and advantages of the present application clearer, the present application is further described in detail below with reference to the drawings and specific embodiments. It should be understood that, specific embodiments described herein are merely for the illustration of the present application, not for limiting the present application. It will be apparent to a person skilled in the art that the present application can be practiced without some of these specific details. The following description of the embodiments is merely to provide a better understanding of the present application by illustrating examples of the present application.

With popularity of network technology, users in a network are increasing gradually. Correspondingly, requests sent or received by the users in the network are also increasing. However, a device or system which sends or receives the request may have a limited processing capability and capacity, so a large number of requests may cause network congestion. In order to ensure stability and robustness of an application, a network system, and the like, there is necessary to perform traffic limitation on the requests. However, the traditional control for traffic limitation on requests is coarse and is inaccurate, and sometimes there may occur failures in the traffic limitation. For example, a rule for the traffic limitation control is that there are 60 requests per second, and counting is made with a unit of second, if there is no requests in a first half of a 1st second, that is, in the first 500 milliseconds of the 1st second, there are 60 requests in the second half of the 1st second, and there are 60 requests in the first half of the 2nd second, that is, in the first 500 milliseconds of the 2nd second, and there are no requests in the second half of the 2nd second. When only the first second is considered, the number of requests is in compliance with the control rule for traffic limitation, and when only the 2nd second is considered, the number of requests is also in compliance with the above control rule for traffic limitation, but when both the number of requests in the first second and the number of requests in the 2nd second are considered, it is found that network congestion occurs in a time period of the second half of the 1st second and the first half of the 2nd second. However, according to the control rule for traffic limitation, traffic limitation will not be performed, thereby causing failure in traffic limitation.

The embodiments of the present application provide a method, an apparatus, a device for controlling traffic limitation and a storage medium, where a unit time length is divided into a plurality of sub-time segments and storage blocks are set in the traffic limitation instance, so that a number of requests in each of the sub-time segments calculated based on the storage blocks, timestamp of a present request, timestamp of a previous request recorded in the traffic limitation instance, the unit time length and a traffic limitation request threshold number are used to obtain request waiting time of the request, and thereby it is determined whether to perform traffic limitation on the present request according to the request waiting time. By refining the traffic limitation control through division of the unit time length into the sub-time segments, accuracy of traffic limitation control can be improved, thereby improving effects of traffic limitation.

The method for controlling traffic limitation in the embodiments of the present application may be applicable to an apparatus or device that receives or sends a request, and the type of the apparatus or device that receives or sends the request is not limited here. For example, FIG. 1 is a schematic view of an application scenario of an example of a method for controlling traffic limitation according to an embodiment of the present application. As shown in FIG. 1, a terminal device 11 may communicate and interact with a server 12. The terminal device 11 may accept a user's operation, then sends a request to the server 12, and the server 12 may receive the request. The method for controlling traffic limitation in the embodiments of the present application may be applicable to the terminal device 11 or the server 12, which is not limited here. In some examples, other apparatuses or devices may be provided between the terminal device 11 and the server 12, and the method for controlling traffic limitation in the embodiments of the present application may further be applicable to the other apparatuses and devices between the terminal device 11 and the server 12, which is not limited here.

Figure 2:
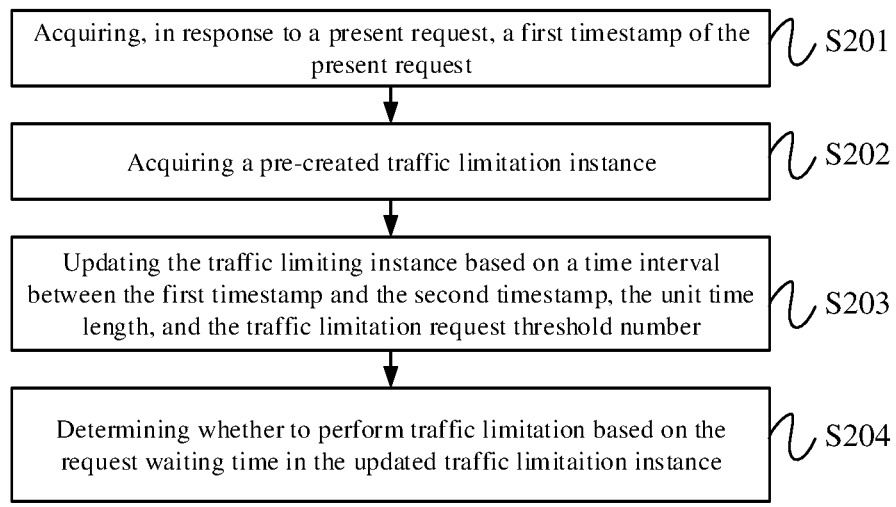
FIG. 2 is a flowchart of a method for controlling traffic limitation according to an embodiment of the present application.

The present application provides a method for controlling traffic limitation, which may be applicable to an apparatus for controlling traffic limitation or a device for controlling traffic limitation, which is not limited here. FIG. 2 is a flowchart of a method for controlling traffic limitation according to an embodiment of the present application. As shown in FIG. 2, the method for controlling traffic limitation may include steps S201 to S204.

In step S201, a first timestamp of a present request is acquired in response to the present request.

The first timestamp may be acquired upon the request is received or sent. The first timestamp is a timestamp of the present request, and the first timestamp may characterize a time point of the present request.

In step S202, a pre-created traffic limitation instance is obtained.

The traffic limitation instance includes N storage blocks, a total number of instance requests, a traffic limitation request threshold number, an identifier of a storage block for a previous request, a second timestamp of the previous request and request waiting time. The traffic limitation instance may be a thread-level instance, that is, a host program of the traffic limitation instance is a thread program, and the traffic limitation instance may be called by a thread. Alternatively, the traffic limitation instance may be a process-level instance, that is, a host program of the traffic limitation instance is a process program, and the traffic limitation instance may be called by a process. The Level of the traffic limitation instance may be specifically set based on an involved traffic limitation scenario and traffic limitation requirements, which is not limited here. The traffic limitation instance may be adapted to a single program such as a client program at a terminal device, or may be adapted to a program at a service side, so that control of a flow rate of data in a single channel or control of entire flow rate of data in a plurality channels can be achieved to ensure a stronger and wider applicability of the traffic limitation control, and the traffic limitation control can be achieved without using an architecture that is difficult to be deployed such as a server/client architecture (that is, a C/S architecture) or a distributed architecture, so as to improve application efficiency of the traffic limitation control in the single program.

The N storage blocks correspond to N sub-time segments which are formed by dividing a pre-set unit time length, that is, one storage block corresponds to one sub-time segment. N is an integer greater than 1. The N sub-time segments may be in series, so that any time point must fall into one of the N sub-time segments. Each of the storage blocks stores a number of requests within the respective sub-time segment corresponding to the storage block. In some examples, the N storage blocks may exist in a form of data blocks or a linked list, which is not limited here. The unit time length, a time length of the sub-time segment and N may be set based on specific scenarios and specific requirements, which is not limited here. The unit time length may be a time length in the order of second, a time length in the order of millisecond, or a time length in any other order, which is not limited here. The time length of the sub-time segment may be a time length in the order of second, a time length in the order of millisecond, or a time length in any other order, which is not limited here. In some examples, the unit time length may be a time length in the order of second, for example, the unit time length may be 1 second. In some examples, the time length of the sub-time segment may be a time length in the order of millisecond, for example, the time length of the sub-time segment may be 10 milliseconds. As another example, a time length of the sub-time segment may be 20 milliseconds. A sum of time lengths of the N sub-time segments equals to the unit time length. In a case where the time lengths of the N sub-time segments are equal with each other, a product of the time length of the sub-time segment multiplied by N equals to the unit time length. Alternatively, the unit time length and the time length of the sub-time segment may be set first, and then a ratio of the unit time length to the time length of the sub-time segment is determined as the N.

The total number of instance requests is a sum of respective numbers of requests stored in the respective storage blocks.

The traffic limitation request threshold number is a threshold number of requests that is required by the traffic limitation. If the total number of instance requests is greater than or equal to the traffic limitation request threshold number, it means that there is high probability that the network is congested, and if the total number of instance requests is less than the traffic limitation request threshold number, it means that the network is relatively unblocked.

The identifier of the storage block for the previous request is an identifier of a storage block corresponding to a sub-time segment to which the previous request belongs. The identifier of the storage block is used to identify the storage block, and is not limited here. In some examples, the identifier of the storage block may include an index of the storage block, and the storage block may be quickly determined with the index. For a different time point, its corresponding sub-time segment is different. The identifier of the storage block may be set according to the corresponding sub-time segment, and as the time point changes, the storage block corresponding to the time point also changes. For example, assuming that the unit time length is 1 second, and the time length of the sub-time segment is 10 milliseconds, the unit time length is divided into 100 sub-time segments: an initial time point is set to be 0, where counting is started t: an identifier of a storage block corresponding to a time period from the time point of 0 ms to a time point of 10 ms (not including 10 ms) is 1, an identifier of a storage block corresponding to a time period from the time point of 10 ms to a time point of 20 ms (not including 20 ms) is 2, . . . , an identifier of a storage block corresponding to a time period from a time point of 980 ms to a time point of 990 ms (not including 990 ms) is 99, an identifier of a storage block corresponding to a time period from the time point of 990 ms to a time point of 1000 ms (not including 1000 ms) is 100, and identifiers of storage blocks corresponding to time points after the time point of 1000 ms (that is, the time point of 1 second) cycle from 1 to 100; if a time point is 21214 microseconds, that is, 21.214 milliseconds, an identifier of a storage block corresponding to the time point of 21214 microseconds is 3: if a time point is 43358 microseconds, that is, 43.358 milliseconds, an identifier of a storage block corresponding to the time point of 43358 microseconds is 5.

The second timestamp is a timestamp of the previous request, and the second timestamp may characterize a time point of the previous request. The previous request is a last request relative to the present request.

The request waiting time is a time length that a request should wait before being sent or received. For example, the request waiting time is 0, this means that the request does not need to wait and may be sent or received directly. The request waiting time is greater than 0, this means that the request needs to wait for the request waiting time before being sent or received.

For example, FIG. 3 is a schematic view of an example of constituent elements of a traffic limitation instance according to the embodiments of the present application. As shown in FIG. 3, the traffic limitation instance may include N storage blocks which correspond to millisecond-level sub-time periods respectively, the number in each of the storage blocks represents the number of requests in a corresponding sub-time period stored in the storage block, the number under a storage block is an identifier of the storage block, and the identifier of the storage block is an index of the storage block. The number of requests stored in the storage block with an index 1 is 7, the number of requests stored in the storage block with an index 2 is 6, and the number of requests stored in the other storage blocks is 0. The traffic limitation instance includes an index of a storage block for the present request, which is 2. The traffic limitation instance includes a total number of instance requests, which is 13. The traffic limitation instance includes a traffic limitation request threshold number, which is 200. The traffic limitation instance includes a second timestamp, which includes tv_sec and tv_usec, the tv_sec represents a second, the tv_usec represents a microsecond, the tv_sec is 1622471313, and the tv_usec represents 21214 microseconds, that is, the time point characterized by the second timestamp is 1622471313 seconds and 21214 microseconds. The traffic limitation instance includes request waiting time, which is 0.

In step S203, the traffic limitation instance is updated based on a time interval between the first timestamp and the second timestamp, the unit time length and the traffic limitation request threshold number.

The time interval between the first timestamp and the second timestamp, that is, a time interval between the previous request and the present request, may be obtained based on the first timestamp and the second timestamp. Whether the present request and the previous request are made within a same unit time length may be determined based on the time interval and the unit time length, so as to update the traffic limitation instance based on the time interval, the unit time length, and the traffic limitation request threshold number. Specifically, the number of requests stored in the respective storage blocks, the total number of instance requests, the identifier of the storage block for the previous request, the second timestamp, and the request waiting time in the traffic limitation instance may be updated.

An updated number of requests stored in each of the storage blocks may characterize a number of requests in respective sub-time segments within a unit time length to which the present request belongs. The updated total number of instance requests may represent a sum of the numbers of requests in the unit time length to which the present request belongs, so that a degree of network congestion that may be caused by the numbers of requests in the unit time length to which the present request belongs may be determined based on the traffic limitation request threshold number, and the degree of the network congestion may be reflected by the updated request waiting time. The longer the request waiting time is, the greater the degree of the network congestion is, so a relatively long request waiting time needs to be set to reduce the network congestion: the shorter the request waiting time is, the smaller the degree of the network congestion is, so the network congestion may be reduced by setting a relatively short request waiting time: a request waiting time of 0 represents that the network is substantially unblocked. The unit time length to which the present request belongs refers to a unit time length which ends at the time point of the present request.

In step S204, whether to perform traffic limitation is determined based on the request waiting time in the updated traffic limitation instance.

The request waiting time in the updated traffic limitation instance (that is the updated request waiting time) can reflect a degree of network congestion, so whether to perform traffic limitation may be determined based on the updated request waiting time in connection with scenarios and requirements. The traffic limitation herein may employ a variety of approaches, and is not limited here. For example, waiting is performed according to the request waiting time, and the requests may be allowed to pass when duration of the waiting reaches the request waiting time. As another example, the request may be discarded directly.

The determination of whether to perform traffic limitation may be executed by a host program of the traffic limitation instance, which is not limited here.

In the embodiments of the present application, the traffic limitation instance includes N storage blocks, which stores respective number of requests within respective sub-time segments which are obtained by dividing a unit time length. The first timestamp of the present request and the traffic limitation instance are acquired, and it is determined whether the present request and the previous request are occurred in a same unit time length based on the time interval between the first timestamp and the second timestamp of the previous request in the traffic limitation instance and the unit time length, so as to update the traffic limitation instance based on the time interval, the unit time length and the traffic limitation request threshold number. The updated number of requests in the storage blocks may characterize the number of requests for the respective sub-time segments within the unit time length to which the present request belongs. The updated total number of instance requests may characterize a sum of the number of requests in of the respective sub-time segments within the unit time length to which the present request belongs, that is, the updated total number of instance requests characterizes a sum of numbers of requests within the unit time length to which the present request belongs. The request waiting time in the updated traffic limitation instance under a condition of the updated number of requests in the storage block and the updated total number of instance requests can reflect degree of network congestion. By updating the traffic limitation instance, a number of requests in respective sub-time segments can be updated with a higher accuracy, a sum of numbers of requests within a unit time length constituted by the sub-time segments for the present request can be updated with a higher accuracy, and the request waiting time can then be updated. Whether to perform traffic limitation is then determined based on the request waiting time that can reflect the degree of network congestion, so failure in traffic limitation caused by a coarse traffic limitation control can be avoided, thereby improving accuracy of traffic limitation control.

In a practical test, a time length of the sub-time segment is set to be 10 milliseconds, and the unit time length is set to be 1 second, that is, the unit time length is divided into 100 sub-time segments. With the method for controlling traffic limitation in the embodiments of the present application, a control target of uniform data transmission under a traffic limitation request threshold number which is in the order of a single digit up to a hundred thousand may be achieved, and no failure in the traffic limitation is occurred. Moreover, the sub-time segment is set to be in the order of millisecond, and the unit time length is set to be in the order of second, so accuracy of the traffic limitation control, resource consumption of the traffic limitation control and the time required for traffic processing corresponding to a request can be balanced, so as to achieve better comprehensive effects.

Figure 4:
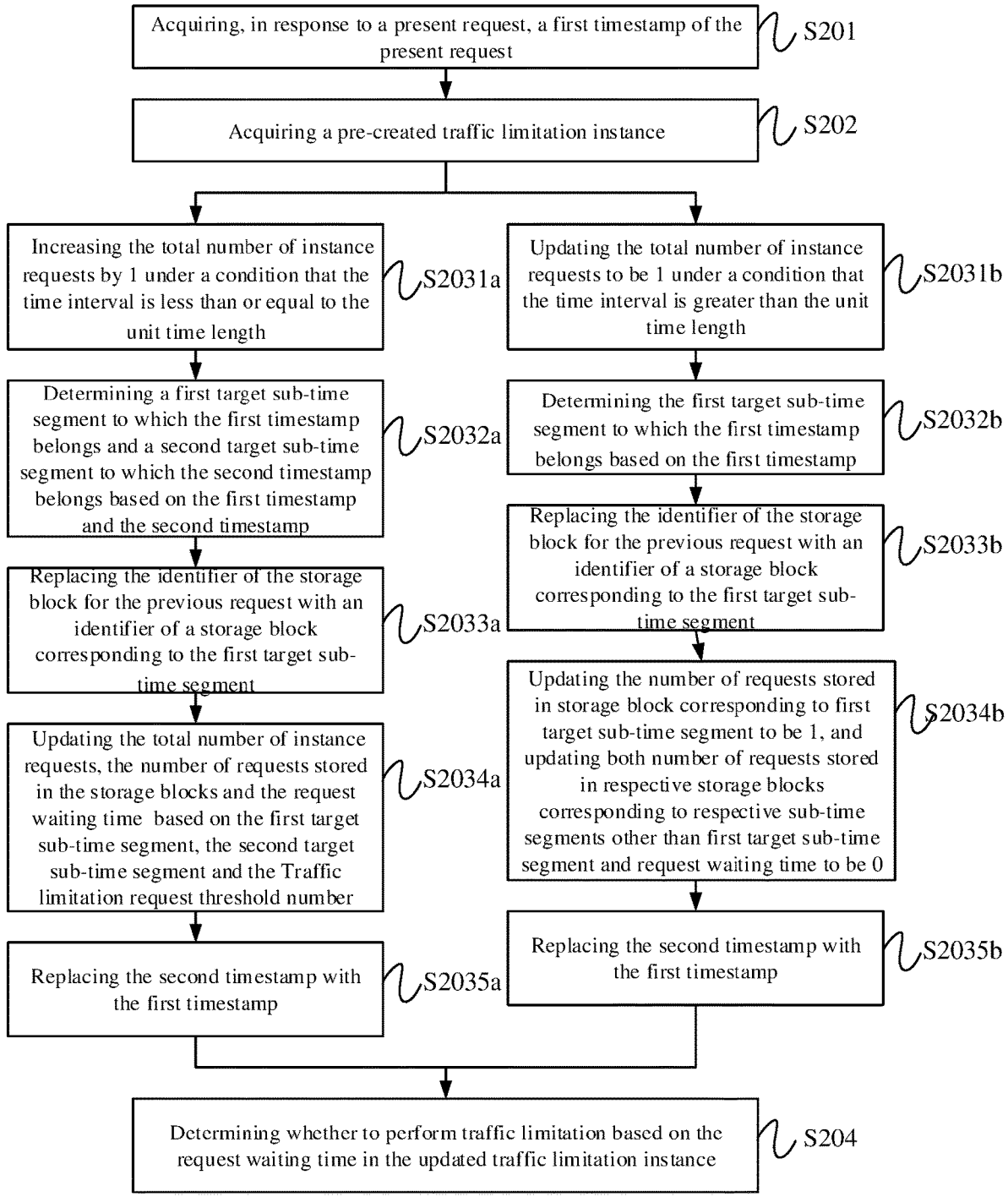
FIG. 4 is a flowchart of a method for controlling traffic limitation according to an embodiment of the present application.

Depending on comparison of the time interval between the first timestamp and the second timestamp with the unit time length, approaches for updating the traffic limitation instance may be different. FIG. 4 is a flowchart of a method for controlling traffic limitation according to an embodiment of the present application. FIG. 4 differs from FIG. 2 in that the step S203 in FIG. 2 may be specifically divided into steps S2031a to S2035a, or may be specifically divided into steps S2031b to S2035b.

In step S2031a, under a condition that the time interval is less than or equal to the unit time length, the total number of instance requests may be increased by 1.

The time interval being less than or equal to the unit time length means that the present request and the previous request are within the same unit time length, and the total number of instance requests needs to be increased by 1. It should be noted that, the total number of instance requests increased by 1 is used as the total number of instance requests in the updated traffic limitation instance, or may be further used in calculation, and the calculated total number of instance requests may be used as the total number of instance requests in the updated traffic limitation instance. The acquisition of the total number of instance requests in the updated traffic limitation instance is further related to subsequent steps.

In step S2032a, a first target sub-time segment to which the first timestamp belongs and a second target sub-time segment to which the second timestamp belongs are determined based on the first timestamp and the second timestamp.

The first target sub-time segment is a sub-time segment to which the first timestamp belongs. The first timestamp may characterize a time point of the present request. The second target sub-time segment is a sub-time segment to which the second timestamp belongs. The second timestamp may characterize a time point of the previous request.

In some examples, a time point is related to an identifier of a storage block, and can be used to determine the identifier of the storage block. There is a correspondence relationship between the storage blocks and the sub-time segments. The first target sub-time segment and the second target sub-time segment may be determined based on the correspondence relationship between the storage blocks and the sub-time segments, the first timestamp and the second timestamp.

In step S2033a, the identifier of the storage block for the previous request may be replaced with an identifier of a storage block corresponding to the first target sub-time segment.

For a next request, the identifier of the storage block of the present request is used the identifier of the storage block for the previous request in the traffic limitation instance. The identifier of the storage block for the previous request in the traffic limitation instance is replaced with the identifier of the storage block corresponding to the first target sub-time segment, that is, the identifier of the storage block for previous request in the traffic limitation instance is updated.

In step S2034a, the total number of instance requests, the number of requests stored in the storage blocks, and the request waiting time are updated based on the first target sub-time segment, the second target sub-time segment and the traffic limitation request threshold number.

By comparing the first target sub-time segment with the second target sub-time segment, a relative time relationship between the first target sub-time segment and the second target sub-time segment can be determined, and then is used to determine the updated total number of instance requests, the updated number of requests stored in the storage blocks, and the updated request waiting time.

In step S2035a, the second timestamp is replaced with the first timestamp.

For a next request, the timestamp of the present request, that is, the first timestamp, is used as the timestamp of the previous request, that is, the second timestamp, in the traffic limitation instance. The second timestamp is replaced with the first timestamp, that is, the second timestamp in the traffic limitation instance is updated.

In step S2031b, under a condition that the time interval is greater than the unit time length, the total number of instance requests is updated to be 1.

The time interval being greater than the unit time length means that the present request and the previous request are not in a same unit time length, and related information in the traffic limitation instance corresponding to the unit time length to which the previous request belongs is invalid in the unit time length to which the present request belongs, and therefore the traffic limitation instance needs to be updated.

Specifically, the total number of instance requests in the traffic limitation instance corresponding to the unit time length to which the previous request belongs is cleared, and is added with 1 for the e present request, that is, the total number of instance requests is updated to be 1.

In step S2032b, according to the first timestamp, the first target sub-time segment to which the first timestamp belongs is determined.

Details of step S2032b may be implemented by reference to the relevant descriptions with respect to step S2032a in the above embodiment, and will not be repeated here.

In step S2033b, the identifier of the storage block of the previous request is replaced with an identifier of a storage block corresponding to the first target sub-duration segment.

Details of step S2033b may be implemented by reference to the relevant descriptions with respect to the step S2033a in the above embodiment, and will not be repeated here.

In step S2034b, the number of requests stored in the storage block corresponding to the first target sub-time segment may be updated to be 1, and both the number of requests stored in respective storage blocks corresponding to respective sub-time segments other than the first target sub-time segment and the request waiting time are updated to be 0.

The number of requests in the respective storage blocks in the traffic limitation instance corresponding to the unit time length to which the previous request belongs is invalid in the unit time length to which the present request belongs. Accordingly, the number of requests in the respective storage blocks in the traffic limitation instance may be cleared first, and then the number of requests in the storage block corresponding to the first target sub-time segment is increased by 1 for the present request.

In step S2035b, the second timestamp is replaced with the first timestamp.

Details of step S2035b may be implemented by reference to the relevant descriptions with respect to the step S2035a in the above embodiment, and will not be repeated here.

For example, the unit time length is 1 second, the time length of the sub-time segment is 10 milliseconds, the traffic limitation instance includes 100 storage blocks, the 100 storage blocks include respective identifiers from 1 to 100, the time point of the present request characterized by the first timestamp is 1 second 523 milliseconds, the time point of the previous request characterized by the second timestamp is 10 milliseconds, and the time interval between the first timestamp and the second timestamp is 1513 milliseconds that is greater than 1 second, and in this case, the total number of instance requests is updated to be 1: the identifier of the storage block for the previous request, that is, the identifier 2 corresponding to the time point of 10 milliseconds, is replaced with an identifier of a storage block corresponding to the first target sub-time segment, that is, an identifier 53 corresponding to 1 second 523 milliseconds, the number of requests stored in the storage block with the identifier 53 is updated to be 1, the number of requests stored in respective storage blocks other than the storage block with the identifier 53 are all updated to be 0, and the second timestamp of the time point of 10 milliseconds is replaced with the time point of 1 second 523 milliseconds.

Figure 5:
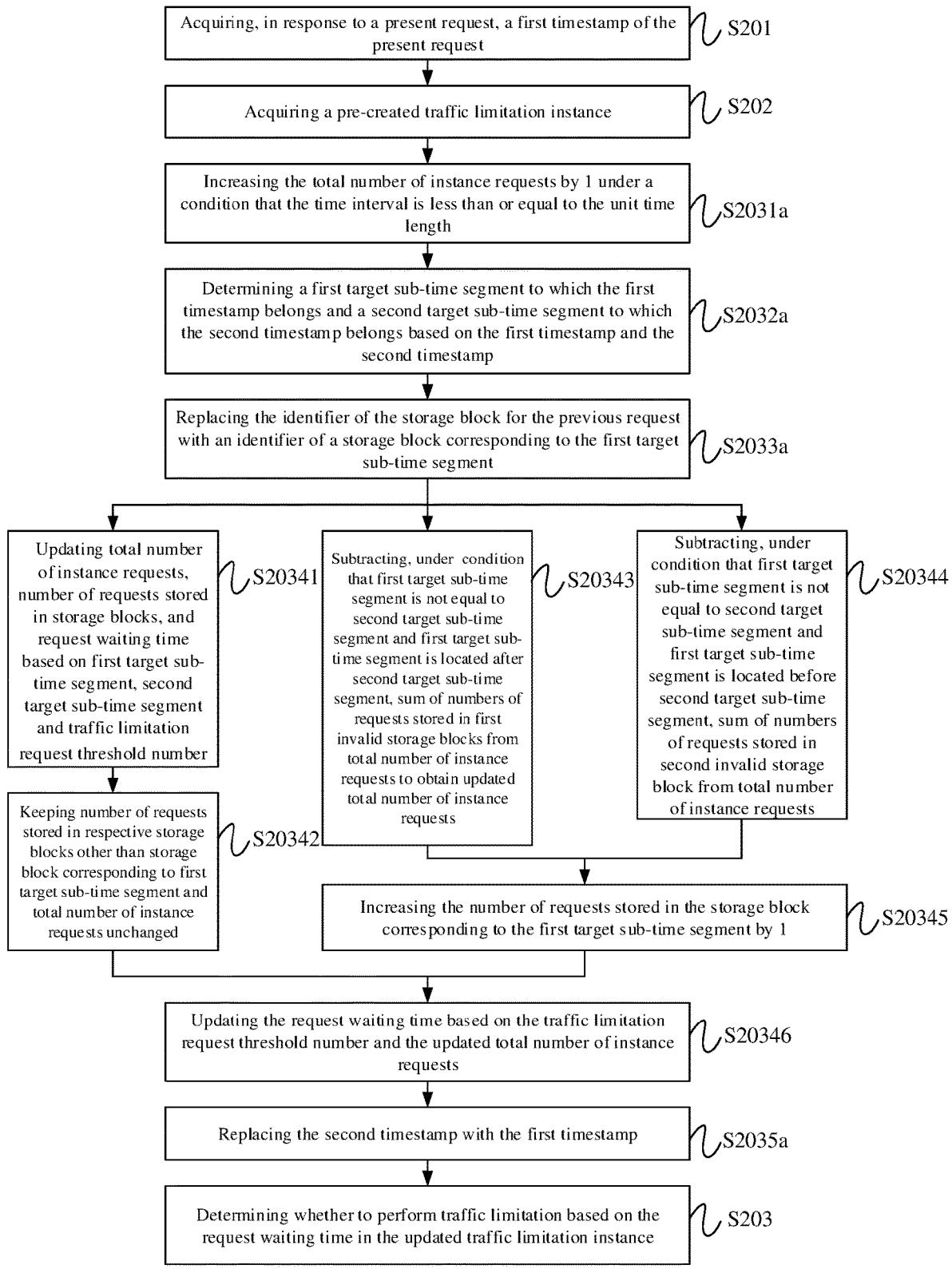
FIG. 5 is a flowchart of a method for controlling traffic limitation according to an embodiment of the present application.

Under a condition that the time interval is less than or equal to the unit time length, there is a different relative time relationship between the first target sub-time segment and the second target sub-time segment, and approaches for updating the total number of instance requests, the number of requests stored in the respective storage blocks and the request waiting time in the traffic limitation instance are also different. An approach for updating of the total number of instance requests, the number of requests stored in the respective storage blocks and the request waiting time in the traffic limitation instance under the different relative time relationship between the first target sub-time segment and the second target sub-time segment is described below. FIG. 5 is a flowchart of a method for controlling traffic limitation according to an embodiment of the present application. FIG. 5 shows the detailed description of step S2034a in the branch from the step S2031a to the step S2035a in FIG. 4. The Step S2034a in FIG. 4 may be divided into at least a part of steps from the step S20341 to the step S20346 in FIG. 5, which is not limited here.

In step S20341, under a condition that the first target sub-time segment is equal to the second target sub-time segment, the number of requests stored in the storage block corresponding to the first target sub-time segment is increased by 1.

The first target sub-time segment being equal to the second target sub-time segment means that the first target sub-time segment and the second target sub-time segment are the same sub-time segment. Since the first target sub-time segment and the second target sub-time segment are the same sub-time segment, the number of requests in sub-time segments other than the first target sub-time segment does not change, and only the number of requests stored in the storage block corresponding to the first target sub-time segment needs to be updated. The number of requests stored in the storage block corresponding to the first target sub-time segment is increased by 1, that is, the number of requests stored in the storage block corresponding to the second target sub-time segment is increased by 1.

In step S20342, the number of requests stored in respective storage blocks other than the storage block corresponding to the first target sub-time segment and the total number of instance requests are kept unchanged.

Since the total number of instance requests has been increased by 1 in the step S2031a, the total number of instance requests may be kept unchanged in the step S20342.

In step S20343, under a condition that the first target sub-time segment is not equal to the second target sub-time segment and the first target sub-time segment is located after the second target sub-time segment, a sum of the numbers of requests stored in first invalid storage blocks may be subtracted from the total number of instance requests to obtain the updated total number of instance requests.

The first target sub-time segment being not equal to the second target sub-time segment means that the first target sub-time segment and the second target sub-time segment are different sub-time segments. The relative time relationship between the first target sub-time segment and the second target sub-time segment needs to be determined again. The relative time relationship between the first target sub-time segment and the second target sub-time segment may include that the first target sub-time segment is located after the second target sub-time segment or that the first target sub-time segment is located before the second target sub-time segment.

The first invalid storage blocks include storage blocks corresponding to a sub-time segment between the first target sub-time segment and the second target sub-time segment and storage blocks corresponding to the first target sub-time segment. The numbers of requests stored in the respective first invalid storage blocks are the numbers of requests that are counted in a last unit time length before the unit time length to which the present request belongs, and are not related to the unit time length to which the present request belongs, that is, the numbers of requests stored in the respective first invalid storage blocks are redundant and invalid for the updated total number of instance requests. In order to prevent the redundant data, the total number of instance requests subtracted by the sum of the numbers of requests stored in the respective first invalid storage blocks is used as the updated total number of instance requests.

The numbers of requests stored in the respective first invalid storage blocks are cleared to prevent the number of requests in the last unit time length before the unit time length to which the present request belongs from affecting the number of requests in the unit time length to which the present request belongs.

In step S20344, under a condition that the first target sub-time segment is not equal to the second target sub-time segment and the first target sub-time segment is located before the second target sub-time segment, a sum of the number of requests stored in second invalid storage blocks may be subtracted from the total number of instance requests.

The second invalid storage blocks include storage blocks corresponding to all sub-time segments after the second target sub-time segment, storage blocks corresponding to all sub-time segments before the first target sub-time segment, and the storage block corresponding to the first target sub-time segment. The numbers of requests stored in the respective second invalid storage blocks are the number of requests that are counted in the last unit time length before the unit time length to which the present request belongs, and are not related to the unit time length to which the present request belongs, that is, the numbers of requests stored in the respective second invalid storage blocks are redundant and invalid for the updated total number of instance requests. In order to prevent the redundant data, the total number of instance requests subtracted by the sum of the numbers of requests stored in the respective second invalid storage blocks is used as the updated total number of instance requests.

The numbers of requests stored in the respective second invalid storage blocks are cleared to prevent the number of requests in the last unit time length before the unit time length to which the present request belongs from affecting the number of requests in the unit time length to which the present request belongs.

In step S20345, the number of requests stored in the storage blocks corresponding to the first target sub-time segment is increased by 1.

The sub-time segment corresponding to the present request is the first target sub-time segment, and the number of requests stored in the storage block corresponding to the first target sub-time segment is increased by 1, and used as the number of requests stored in the storage block corresponding to the updated first target sub-time segment.

Under a condition that the first target sub-time segment is not equal to the second target sub-time segment and the first target sub-time segment is located after the second target sub-time segment, the number of requests stored in other storage block other than the first invalid storage block are kept unchanged.

Under a condition that the first target sub-time segment is not equal to the second target sub-time segment and the first target sub-time segment is located before the second target sub-time segment, the number of requests stored in other storage block other than the second invalid storage block are kept unchanged.

In step S20346, the request waiting time is updated based on the traffic limitation request threshold number and the updated total number of instance requests.

The updated total number of instance requests is a total number of instance requests in the unit time length to which the present request belongs. A result of comparison of the updated total number of instance requests with the traffic limitation request threshold number is obtained. The result can characterize whether the total number of instance requests within the unit time length to which the present request belongs is greater than or equal to the traffic limitation request threshold number, and can be used to update the request waiting time.

Under a condition that the updated total number of instance requests is less than the traffic limitation request threshold number, the request waiting time is updated to be 0. The updated total number of instance requests being less than the traffic limitation request threshold number means that the network is relatively smooth, so the request waiting time is updated to be 0 to reflect that the network is relatively smooth.

Under a condition that the updated total number of instance requests is greater than or equal to the traffic limitation request threshold number, the request waiting time is updated to be a sum of time lengths of m sub-time segments, where m is a positive integer. The updated total number of instance requests being greater than or equal to the traffic limitation request threshold number means that the network may be congested, so the request waiting time which is not 0 is set to mitigate the network congestion. The m may be 1 or an integer greater than 1.

In some examples, the number of requests stored in respective storage blocks which correspond to sub-time segments after the first target sub-time segment, a first sub-time segment to the first target sub-time segment in the order are subtracted from the updated total number of instance requests, until the total number of instance requests may be reduced to be less than the traffic limitation request threshold number: the number of storage blocks corresponding to those numbers of requests which are subtracted in the order may be determined as the m; and the request waiting time may be updated to be the sum of time lengths of the m sub-time segments.

For example, the time length of the sub-time segment is 10 milliseconds, the traffic limitation request threshold number is 200, the traffic limitation instance includes 10 storage blocks with identifiers from 1 to 10, the order of the sub-time segments is the same the order of the identifiers of the storage blocks, a storage block corresponding to the first target sub-time segment has an identifier of 5, the updated total number of instance requests is 205, the number of requests stored in a storage block with an identifier of 6 is 2, and the number of requests stored in a storage block with an identifier of 7 is 5. In this case, after the updated total number of instance requests is subtracted by the number of requests, 2, stored in the storage block with the identifier 6 and then subtracted by the number of requests, 5, stored in the storage block with the identifier 7, and the total number of instance requests is reduced to 198, and in this case the number of storage blocks corresponding to the subtracted numbers of requests is 2, so the m=2, and the request waiting time is updated to be 20 milliseconds.

As another example, the time length of the sub-time segment is 10 milliseconds, the traffic limitation request threshold number is 200, the traffic limitation instance includes 10 storage blocks with identifiers from 1 to 10, the order of the sub-time segments is the same as the order of the identifiers of the storage blocks, a storage block corresponding to the first target sub-time segment has an identifier of 9, the updated total number of instance requests is 207, the number of requests stored in a storage block with an identifier 10 is 4, the number of requests stored in a storage block with an identifier 1 is 2, and the number of requests stored in a storage block with an identifier 2 is 3. In this case, after the updated total number 207 of the instance requests is subtracted by the number of requests, 4, stored in the storage block with the identifier 10, the number of requests, 2, stored in the storage block with the identifier 1, and the number of requests, 3, stored in the storage block with the identifier 1, the total number of instance requests is reduced to 198, and in this case, the number of storage blocks corresponding to the subtracted numbers of requests is 3, so the m=3, and the request waiting time is updated to be 30 milliseconds.

In some embodiments, there may be a condition where the time interval between the present request and the previous request does not correspond to the request waiting time in the traffic limitation instance, and in this case a feedback on this condition may be provided. Specifically, under a condition that the time interval is less than or equal to the unit time length and the request waiting time is greater than 0, the time interval is compared with the request waiting time; and if the time interval is less than the request waiting time, a difference between the request waiting time and the time interval is calculated and fed back. The host program of the traffic limitation instance may send a message to prompt the user or take other actions based on the difference, which is not limited here.

In some embodiments, the traffic limitation instance may be pre-created. Specifically, the traffic limitation instance may be created based on a pre-determined traffic limitation request threshold number and a pre-determined requested traffic limitation accuracy.

If the requested traffic limitation accuracy is equal to the time length of the sub-time segment, the pre-determined requested traffic limitation accuracy may be used as the time length of the sub-time segment. The number N of the storage blocks (that is, the number N of the sub-time segments) may be calculated based on the time length of the sub-time segment and the unit time length.

In the created traffic limitation instance, the numbers of requests stored in the respective storage blocks, the total number of instance requests and the request waiting time are all 0. The identifier of the storage block for the previous request and the second timestamp in the created traffic limitation instance are in respective initial states, which may be 0, a null state or a default state, which is not limited here. The traffic limitation request threshold number in the created traffic limitation instance is the pre-determined traffic limitation request threshold number.

In some embodiments, the traffic limitation instance may be modified in response to an instance modification instruction according to traffic limitation request threshold number and a requested traffic limitation accuracy in the instance modification instruction.

The time length of the sub-time segment in the modified traffic limitation instance is equal to the requested traffic limitation accuracy in the instance modification instruction. The traffic limitation request threshold number in the modified traffic limitation instance is equal to the traffic limitation request threshold number in the instance modification instruction.

In some examples, an interface may be provided for the traffic limitation instance, and the traffic limitation instance may be modified through the interface to modify the time length of the sub-time segment in the traffic limitation instance, that is, modify the traffic limitation accuracy of the traffic limitation instance; and the traffic limitation instance may be modified through the interface to modify the traffic limitation request threshold number in the traffic limitation instance. With the instance modification instruction, the traffic limitation instance can be adjusted in time, so as to adjust the traffic limitation accuracy and the traffic limitation request threshold number, which improve flexibility and scalability of the traffic limitation control.

In some embodiments, the traffic limitation instance may be cleared if the host program of the traffic limitation instance does not need to perform a traffic limitation control or the host program is logged out. Specifically, in response to a traffic limitation end instruction, the traffic limitation instance is cleared, a data structure and a data object of the traffic limitation instance are all cleared to free up resources occupied by the traffic limitation instance.

An example is given below for specifically illustrating a flow in which the number of requests stored in the storage blocks, the total number of instance requests, the identifier of the storage block of the previous request and the second timestamp in the traffic limitation instance are updated under a condition that the time interval between the first timestamp and the second timestamp is less than or equal to the unit time length. In the example, N=100, the unit time length is 1 second, and the time length of each of sub-time segments is 10 milliseconds. It is assumed that a storage block corresponding to a time period from a time point of 0 ms to a time point of 10 ms (not including 10 ms) has an identifier of 1, a storage block corresponding to a time period from the time point of 10 ms to a time point of 20 ms (not including 20 ms) has an identifier of 2, . . . , a storage block corresponding to a time period from a time point of 980 ms to a time point of 990 ms (not including 990 ms) has an identifier of 99, a storage block corresponding to a time period from the time point of 990 ms to a time point of 1000 ms (not including 1000 ms) has an identifier of 100, and storage blocks corresponding to respective time points after the time point of 1000 ms have respective identifiers which cycles from 1 to 100.

The identifiers of the respective storage blocks, the numbers of requests stored in the respective storage blocks, the total number of instance requests, the identifier of the storage block for the previous request and the second timestamp in an initialized traffic limitation instance are shown in table 1 below:

TABLE 1

| Identifiers of storage blocks | 1 | 2 | 3 | 4 | 5 | 6 | ... | 100 |
|---|---|---|---|---|---|---|---|---|
| Numbers of requests of storage blocks | 0 | 0 | 0 | 0 | 0 | 0 | ... | 0 |
| Total number of instance request | 0 | | | | | | | |
| Identifier of storage block for previous request | null | | | | | | | |
| Second timestamp | 0 | | | | | | | |

As shown in Table 1, in the initialized traffic limitation instance, the numbers of requests stored in the respective storage blocks are all 0, the total number of instance requests is 0, the identifier of the storage block for the previous request is null, and the second timestamp is 0.

When a first request is detected, and a time point characterized by the first timestamp is 8 milliseconds, the numbers of requests stored in the respective storage blocks, the total number of instance requests, the identifier of the storage block for the previous request, and the second timestamp in the updated traffic limitation instance are shown in table 2 below:

TABLE 2

| Identifiers of storage blocks | 1 | 2 | 3 | 4 | 5 | 6 | ... | 100 |
|---|---|---|---|---|---|---|---|---|
| Numbers of requests of storage blocks | 1 | 0 | 0 | 0 | 0 | 0 | ... | 0 |
| Total number of instance request | 1 | | | | | | | |
| Identifier of storage block for previous request | 1 | | | | | | | |
| Second timestamp | 8 ms | | | | | | | |

As shown in table 2, the number of requests stored in a storage block with a storage block identifier of 1 in the first updated traffic limitation instance is 1; and the numbers of requests stored in the respective other storage blocks in the first updated traffic limitation instance are all 0; the total number of instance requests in the first updated traffic limitation instance is 1; the identifier of the storage block for the previous request in the first updated traffic limitation instance is 1; and the second timestamp in the first updated traffic limitation instance is 8 milliseconds, that is, 8 ms.

When a second request is detected and a time point characterized by the first timestamp is 8.001 milliseconds, the numbers of requests stored in the respective storage blocks, the total number of instance requests, the identifier of the storage block for the previous request and the second timestamp in the second updated traffic limitation instance are shown in table 3 below:

TABLE 3

| Identifiers of storage blocks | 1 | 2 | 3 | 4 | 5 | 6 | ... | 100 |
|---|---|---|---|---|---|---|---|---|
| Numbers of requests of storage blocks | 2 | 0 | 0 | 0 | 0 | 0 | ... | 0 |
| Total number of instance request | 2 | | | | | | | |
| Identifier of storage block for previous request | 1 | | | | | | | |
| Second timestamp | 8.001 ms | | | | | | | |

As shown in table 3, the 8.001 milliseconds and the 8 milliseconds are located in the same sub-time segment, which corresponds to the storage block with the storage block identifier 1, the number of requests stored in the storage block with the storage block identifier 1 in the second updated traffic limitation instance is 2, and the numbers of requests stored in the respective other storage blocks in the second updated traffic limitation instance are all 0; the total number of instance requests in the second updated traffic limitation instance is 2; the identifier of the storage block for the previous request in the second updated traffic limitation instance is 1; and the second timestamp in the second updated traffic limitation instance is 8.001 ms.

When a third request is detected and a time point characterized by the first timestamp is 38 milliseconds, the number of requests stored in the respective storage blocks, the total number of instance requests, the identifier of the storage block for the previous request, and the second timestamp in the third updated traffic limitation instance are shown in table 4 below:

TABLE 4

| Identifiers of storage blocks | 1 | 2 | 3 | 4 | 5 | 6 | ... | 100 |
|---|---|---|---|---|---|---|---|---|
| Numbers of requests of storage blocks | 2 | 0 | 0 | 1 | 0 | 0 | ... | 0 |
| Total number of instance request | 3 | | | | | | | |
| Identifier of storage block for previous request | 4 | | | | | | | |
| Second timestamp | 38 ms | | | | | | | |

As shown in table 4, the 38 milliseconds belongs to a different sub-time segment than the 8.001 milliseconds, the sub-time segment to which the 38 milliseconds belongs corresponds to the storage block with the storage block identifier 4, and the sub-time segment to which the 38 milliseconds belongs is located after the sub-time segment to which the 8.001 milliseconds belongs. The number of requests stored in the storage block with the storage block identifier 1 in the third updated traffic limitation instance is 2, the number of requests stored in the storage block with the storage block identifier 4 in the third updated traffic limitation instance is 1, and the numbers of requests stored in respective other storage blocks in the third updated traffic limitation instance is 0. In the third updated traffic limitation instance, the total number of instance requests is 2+1−0−0−0=3, where the subtracted three 0s are respectively the number of requests stored in the storage block with the storage block identifier 2, the number of requests stored in a storage block with a storage block identifier 3, and the number of requests stored in the storage block with the storage block identifier 4 before the updating. The identifier of the storage block for the previous request in the third updated traffic limitation instance is 4; and the second timestamp in the third updated traffic limitation instance is 38 ms.

When a fourth request is detected and a time point characterized by the first timestamp is 48 milliseconds, the number of requests stored in the respective storage blocks, the total number of instance requests, the identifier of the storage block for the previous request, and the second timestamp in the fourth updated traffic limitation instance are shown in table 5 below:

TABLE 5

| Identifiers of storage blocks | 1 | 2 | 3 | 4 | 5 | 6 | ... | 100 |
|---|---|---|---|---|---|---|---|---|
| Numbers of requests of storage blocks | 2 | 0 | 0 | 1 | 1 | 0 | ... | 0 |
| Total number of instance request | 4 | | | | | | | |
| Identifier of storage block for previous request | 5 | | | | | | | |
| Second timestamp | 48 ms | | | | | | | |

As shown in table 5, the 48 milliseconds belongs to a different sub-time segment than the 38 milliseconds, the sub-time segment to which the 48 milliseconds belongs corresponds to the storage block with the storage block identifier 5, and the sub-time segment to which the 48 milliseconds belongs is located after the sub-time segment to which the 38 milliseconds belongs. The number of requests stored in the storage block with the storage block identifier 1 in the fourth updated traffic limitation instance is 2, the number of requests stored in the storage block with the storage block identifier 4 in the fourth updated traffic limitation instance is 1, and the number of requests stored in the storage block with the storage block identifier 5 in the fourth updated traffic limitation instance is 1, and the numbers of requests stored in the respective other storage blocks in the fourth updated traffic limitation instance is 0. The total number of instance requests in the fourth updated traffic limitation instance is 3+1=4; the identifier of the storage block for the previous request in the fourth updated traffic limitation instance is 5, and the second timestamp in the fourth updated traffic limitation instance is the 48 ms.

When a fifth request is detected and a time point characterized by the first timestamp is 1 second and 18 milliseconds, the number of requests stored in the respective storage blocks, the total number of instance requests, the identifier of the storage block for the previous request, and the second timestamp in the fourth updated traffic limitation instance are shown in table 6 below:

TABLE 6

| Identifiers of storage blocks | 1 | 2 | 3 | 4 | 5 | 6 | ... | 100 |
|---|---|---|---|---|---|---|---|---|
| Numbers of requests of storage blocks | 2 | 1 | 0 | 1 | 1 | 0 | ... | 0 |
| Total number of instance request | 3 | | | | | | | |
| Identifier of storage block for previous request | 2 | | | | | | | |
| Second timestamp | 1 s 18 ms | | | | | | | |

As shown in Table 6, an time interval between 1 second and 18 milliseconds and 48 milliseconds is less than 1 second; the 1 second and 18 milliseconds belongs to a different sub-time segment than the 48 milliseconds, the sub-time segment to which the 1 second and 18 milliseconds belongs corresponds to the storage block with the storage block identifier 2, and the sub-time segment to which the 1 second and 18 milliseconds belongs is located before the sub-time segment to which the 48 milliseconds belongs. The number of requests stored in the storage block with the storage block identifier 1 in the fifth updated traffic limitation instance is 2, the number of requests stored in the storage block with the storage block identifier 2 in the fifth updated traffic limitation instance is 1, the number of requests stored in the storage block with the storage block identifier 4 in the fifth updated traffic limitation instance is 1, the number of requests stored in the storage block with the storage block identifier 5 in the fifth updated traffic limitation instance is 1, and the number of requests stored in the respective other storage blocks in the fifth updated traffic limitation instance is 0. In the fifth updated traffic limitation instance, the total number of the requests is 4+1−0− . . . −0−2−0=3, where the subtracted ninety-five 0s are respectively the numbers of requests stored in storage blocks with storage block identifiers 6 to 100, the subtracted one 2 is the number of requests stored in the storage block with the storage block identifier 1, and the subtracted one 0 after 2 is the number of requests stored in the storage block with the storage block identifier 2 before the updating. The identifier of the storage block for the previous request in the fifth updated traffic limitation instance is 2, and the second timestamp in the fifth updated traffic limitation instance is 1 second and 18 millisecond, that is, 1s and 18 ms.

When a sixth request is detected and a time point characterized by the first timestamp is 1 second and 58 milliseconds, the numbers of requests stored in the respective storage blocks, the total number of instance requests, the identifier of the storage block for the previous request, and the second timestamp in the sixth updated traffic limitation instance are shown in table 7 below.

TABLE 7

| Identifiers of storage blocks | 1 | 2 | 3 | 4 | 5 | 6 | ... | 100 |
|---|---|---|---|---|---|---|---|---|
| Numbers of requests of storage blocks | 2 | 1 | 0 | 1 | 1 | 1 | ... | 0 |

TABLE 7-continued

| | |
|---|---|
| Total number of instance request | 2 |
| Identifier of storage block for previous request | 6 |
| Second timestamp | 1 s 58 ms |

As shown in table 7, 1 second and 58 ms belongs to a different sub-time segment than the 1 second and 18 ms, the sub-time segment to which 1 second and 58 ms belongs corresponds to a storage block with a storage block identifier 6, and the sub-time segment to which 1 second and 58 ms belongs is located after the sub-time segment to which 1 second and 18 ms belongs. The number of requests that stored in the storage block with the storage block identifier 2 in the sixth updated traffic limitation instance is 1, and the number of requests stored in the storage block with the storage block identifier 4 in the sixth updated traffic limitation instance is 0, the number of requests stored in the storage block with the storage block identifier 5 in the sixth updated traffic limitation instance is 0, the number of requests stored in the storage block with the storage block identifier 6 in the sixth updated traffic limitation instance is 1, and the numbers of requests stored in the respective other storage blocks in the sixth updated traffic limitation instance is 0. In the sixth updated traffic limitation instance, the total number of instance requests is 3+1−0−1−1−0=2, the first subtracted 0 is the number of requests stored in the storage block with the storage block identifier 3, the subtracted two 1s are respectively the number of requests stored in the storage block with the storage block identifier 4 and the number of requests stored in the storage block with the storage block identifier 5, and the second subtracted 0 is the number of requests stored in the storage block with the storage block identifier 6 before the updating. The identifier of the storage block for the previous request in the sixth updated traffic limitation instance is 6; and the second timestamp in the sixth updated traffic limitation instance is 1s and 58 ms.

Figure 6:
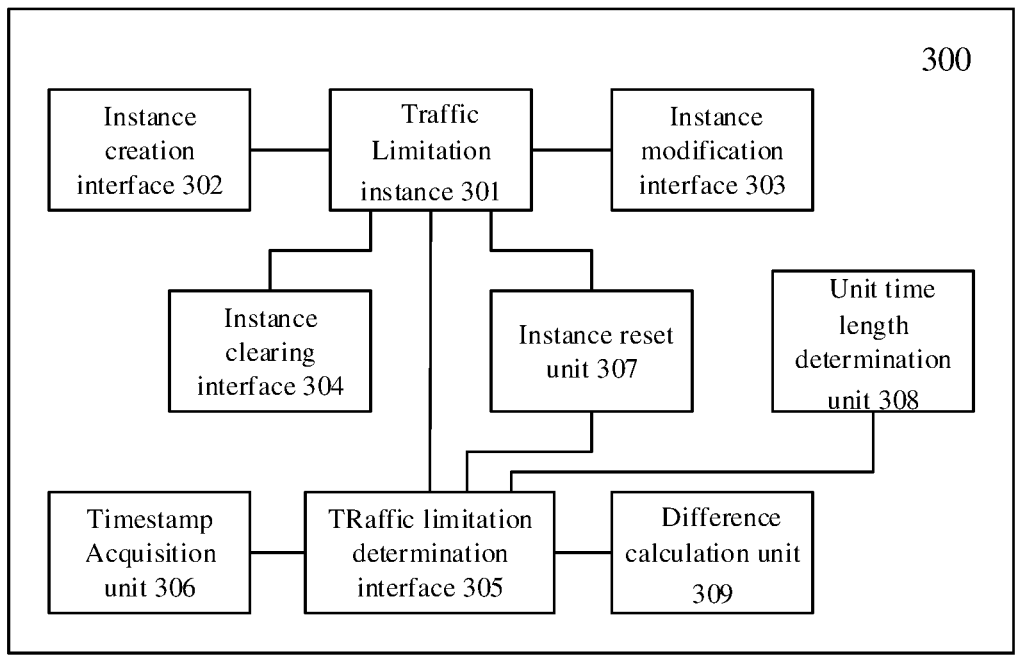
FIG. 6 is a schematic view of an example of a functional structure for controlling traffic limitation according to an embodiments of the present application.

For the traffic limitation in the above embodiments, a plurality of interfaces and a plurality of functional units may be provided at a functional structure level correspondingly. FIG. 6 is a schematic view of an example of a functional structure for controlling traffic limitation according to embodiments of the present application. As shown in FIG. 6, a functional architecture 300 for controlling traffic limitation may include a traffic limitation instance 301, an instance creation interface 302, an instance modification interface 303, an instance clearing interface 304, a traffic limitation determination interface 305, a timestamp acquisition unit 306, an instance reset unit 307, a unit time length determination unit 308, and a difference calculation unit 309.

Details of the traffic limitation instance 301 may be found in relevant description of the traffic limitation instance in the above embodiments, and will not be repeated here.

The instance creation interface 302 is configured to create the traffic limitation instance 301.

The instance modification interface 303 is configured to modify the traffic limitation instance 301.

The instance clearing interface 304 is configured to clear the traffic limitation instance 301.

The traffic limitation determination interface 305 is configured to call the timestamp acquisition unit 306, the instance reset unit 307, the unit time length determination unit 308, and the difference calculation unit 309 to implement at least a part of the method for controlling traffic limitation in the above embodiments, which is not limited here.

The timestamp acquisition unit 306 is configured to acquire the first timestamp in the above embodiments, determine, based on the first timestamp, a first target sub-time segment corresponding to the first timestamp, and further determine, based on the first target sub-time segment, the storage block corresponding to the first target sub-time segment and the identifier of the storage block, which is not limited here.

The instance reset unit 307 is configured to reset the traffic limitation instance 301, and specifically may be configured to reset information such as the number of requests stored in each of the storage blocks, the total number of instance requests, the request waiting time, the second timestamp, the identifier of the storage block for the previous request, and the like in the traffic limitation instance 301, which is not limited here.

The unit time length determination unit 308 is configured to compare the time interval between the first timestamp and the second timestamp with the unit time length in the above embodiments, which is not limited here.

The difference calculation unit 309 is configured to calculate the time interval between the first timestamp and the second timestamp and calculate the difference between the request waiting time and the time interval, which is not limited here.

Figure 7:
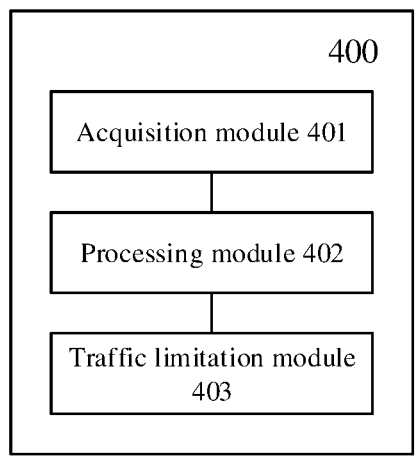
FIG. 7 is a schematic structural view of an apparatus for controlling traffic limitation according to an embodiment of the present application.

The present application further provides an apparatus for controlling traffic limitation that may perform the method for controlling traffic limitation in the above embodiments. The apparatus for controlling traffic limitation may specifically include a terminal device, a server or other types of apparatuses, which is not limited here. FIG. 7 is a schematic structural view of an apparatus for controlling traffic limitation according to an embodiment of the present application. As shown in FIG. 7, an apparatus 400 for controlling traffic limitation may include an acquisition module 401, a processing module 402, and a traffic limitation module 403.

The acquisition module 401 is configured to acquire a first timestamp of a present request and a traffic limitation instance in response to a present request.

The traffic limitation instance includes N storage blocks, a total number of instance requests, a traffic limitation request threshold number, an identifier of a storage block for a previous request, a second timestamp of the previous request and request waiting time. The N storage blocks correspond to N sub-time segments which are formed by dividing a pre-set unit time length, where N is an integer greater than 1. Each of the storage blocks stores a number of requests within the respective sub-time segment corresponding to the storage block. The total number of instance requests is a sum of respective numbers of requests stored in the respective storage blocks.

In some examples, the identifier of the storage block may include an index of the storage block.

The processing module 402 is configured to update the traffic limitation instance based on a time interval between the first timestamp and the second timestamp, the unit time length and the traffic limitation request threshold number.

The traffic limitation module 403 is configured to determine whether to perform traffic limitation based on request waiting time in the updated traffic limitation instance.

In the embodiments of the present application, the traffic limitation instance includes N storage blocks, which stores respective number of requests within respective sub-time segments which are obtained by dividing a unit time length.

The first timestamp of the present request and the traffic limitation instance are acquired, and it is determined whether the present request and the previous request are occurred in a same unit time length based on the time interval between the first timestamp and the second timestamp of the previous request in the traffic limitation instance and the unit time length, so as to update the traffic limitation instance based on the time interval, the unit time length and the traffic limitation request threshold number. The updated number of requests in the storage blocks may characterize the number of requests for the respective sub-time segments within the unit time length to which the present request belongs. The updated total number of instance requests may characterize a sum of the number of requests in of the respective sub-time segments within the unit time length to which the present request belongs, that is, the updated total number of instance requests characterizes a sum of numbers of requests within the unit time length to which the present request belongs. The request waiting time in the updated traffic limitation instance under a condition of the updated number of requests in the storage block and the updated total number of instance requests can reflect degree of network congestion. By updating the traffic limitation instance, a number of requests in respective sub-time segments can be updated with a higher accuracy, a sum of numbers of requests within a unit time length constituted by the sub-time segments for the present request can be updated with a higher accuracy, and the request waiting time can then be updated. Whether to perform traffic limitation is then determined based on the request waiting time that can reflect the degree of network congestion, so failure in traffic limitation caused by a coarse traffic limitation control can be avoided, thereby improving accuracy of traffic limitation control.

In some examples, the processing module 402 may be configured to: increase the total number of instance requests by 1 under a condition that the time interval is less than or equal to the unit time length: determine a first target sub-time segment to which the first timestamp belongs and a second target sub-time segment to which the second timestamp belongs based on the first timestamp and the second timestamp: replace the identifier of the storage block for the previous request with an identifier of a storage block corresponding to the first target sub-time segment: update the total number of instance requests, the number of requests stored in the respective storage blocks, and the request waiting time based on the first target sub-time segment, the second target sub-time segment and the traffic limitation request threshold number; and replace the second timestamp with the first timestamp.

Specifically, the processing module 402 may be configured to: increase the number of requests stored in the storage block corresponding to the first target sub-time segment by 1 under a condition that the first target sub-time segment is equal to the second target sub-time segment: keep the number of requests stored in respective storage blocks other than the storage block corresponding to the first target sub-time segment and the total number of instance requests unchanged: update the request waiting time based on the traffic limitation request threshold number and the updated total number of instance requests.

Specifically, the processing module 402 may be configured to: subtract, under a condition that the first target sub-time segment is not equal to the second target sub-time segment and the first target sub-time segment is located after the second target sub-time segment, the sum of the numbers of requests stored in first invalid storage blocks from the total number of instance requests to obtain the updated total number of instance requests, wherein the first invalid storage blocks include storage blocks corresponding to a sub-time segment between the first target sub-time segment and the second target sub-time segment and a storage block corresponding to the first target sub-time segment: increase the number of requests stored in the storage block corresponding to the first target sub-time segment by 1: update the request waiting time based on the traffic limitation request threshold number and the updated total number of instance requests.

Specifically, the processing module 402 may be configured to: subtract, under a condition that the first target sub-time segment is not equal to the second target sub-time segment and the first target sub-time segment is located before the second target sub-time segment, the sum of the number of requests stored in second invalid storage blocks from the total number of instance requests, wherein the second invalid storage blocks include storage blocks corresponding to all sub-time segments after the second target sub-time segment, storage blocks corresponding to all sub-time segments before the first target sub-time segment, and the storage blocks corresponding to the first target sub-time segment: increase the number of requests stored in the storage block corresponding to the first target sub-time segment by 1; update the request waiting time based on the traffic limitation request threshold number and the updated total number of instance requests.

In some examples, the processing module 402 may be configured to: update the request waiting time to be 0 under a condition that the updated total number of instance requests is less than the traffic limitation request threshold number: update, under a condition that the updated total number of instance requests is greater than or equal to the traffic limitation request threshold number, the request waiting time to be a sum of time lengths of m sub-time segments, where m is a positive integer.

Specifically, the processing module 402 may be configured to: subtract the number of requests stored in storage blocks which correspond to sub-time segments after the first target sub-time segment, a first sub-time segment to the first target sub-time segment in the order from the updated total number of instance requests, until the total number of instance requests is reduced to be less than the traffic limitation request threshold number: determine the number of storage blocks corresponding to the number of requests which are subtracted in sequence to be m; and update the request waiting time to be the sum of time lengths of the m sub-time segments.

In some examples, the processing module 402 may be further configured to: update the total number of instance requests to be 1 under a condition that the time interval is greater than the unit time length: determine a first target sub-time segment to which the first timestamp belongs based on the first timestamp: replace the identifier of the storage block for the previous request to be an identifier of a storage block corresponding to the first target sub-time segment; update the number of requests stored in the storage block corresponding to the first target sub-time segment to be 1, and update both the number of requests stored in respective storage blocks corresponding to respective sub-time segments other than the first target sub-time segment and the request waiting time to be 0; and replace the second timestamp with the first timestamp.

In some examples, the processing module 402 may be further configured to: compare the time interval with the request waiting time under a condition that the time interval is less than or equal to the unit time length and if the request waiting time is greater than 0; calculate and feedback a difference between the request waiting time and the time interval under a condition that the time interval is less than the request waiting time.

Figure 8:
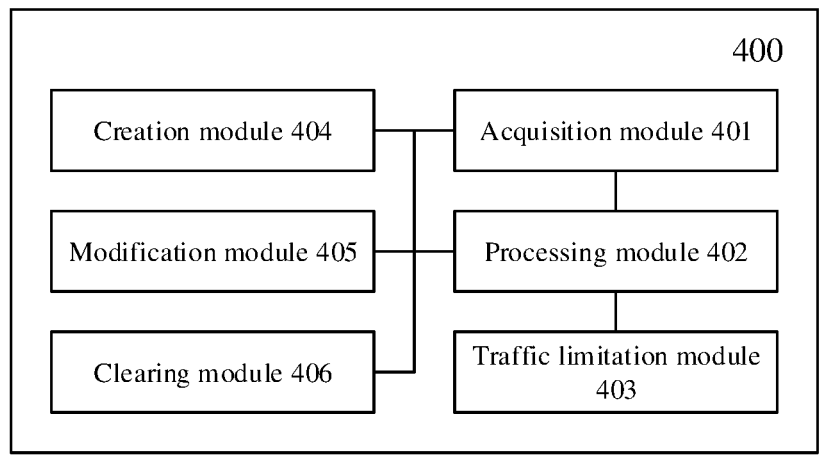
FIG. 8 is a schematic structural view of an apparatus for controlling traffic limitation according to an embodiment the present application.

FIG. 8 is a schematic structural view of an apparatus for controlling traffic limitation according to an embodiment of the present application. FIG. 8 differs from FIG. 7 in that the apparatus 400 for controlling traffic limitation shown in FIG. 8 may further include a creation module 404, a modification module 405, and a clearing module 406.

The creation module 404 may be configured to create the traffic limitation instance based on a pre-determined traffic limitation request threshold number and a pre-determined requested traffic limitation accuracy.

The requested traffic limitation accuracy is equal to the time length of the sub-time segment. The number of requests stored in the respective storage blocks, the total number of instance requests and the request waiting time in the created traffic limitation instance are all 0. The identifier of the storage block for the previous request and the second timestamp in the created traffic limitation instance are in respective initial states. The traffic limitation request threshold number in the created traffic limitation instance is the pre-determined traffic limitation request threshold number.

The modification module 405 may be configured to modify the traffic limitation instance in response to an instance modification instruction and based on the traffic limitation request threshold number and the requested traffic limitation accuracy in the instance modification instruction.

The time length of the sub-time segment in the modified traffic limitation instance is equal to the requested traffic limitation accuracy in the instance modification instruction. The traffic limitation request threshold number in the modified traffic limitation instance is equal to the traffic limitation request threshold number in the instance modification instruction.

The clearing module 406 may be configured to clear the traffic limitation instance in response to a traffic limitation end instruction.

Figure 9:
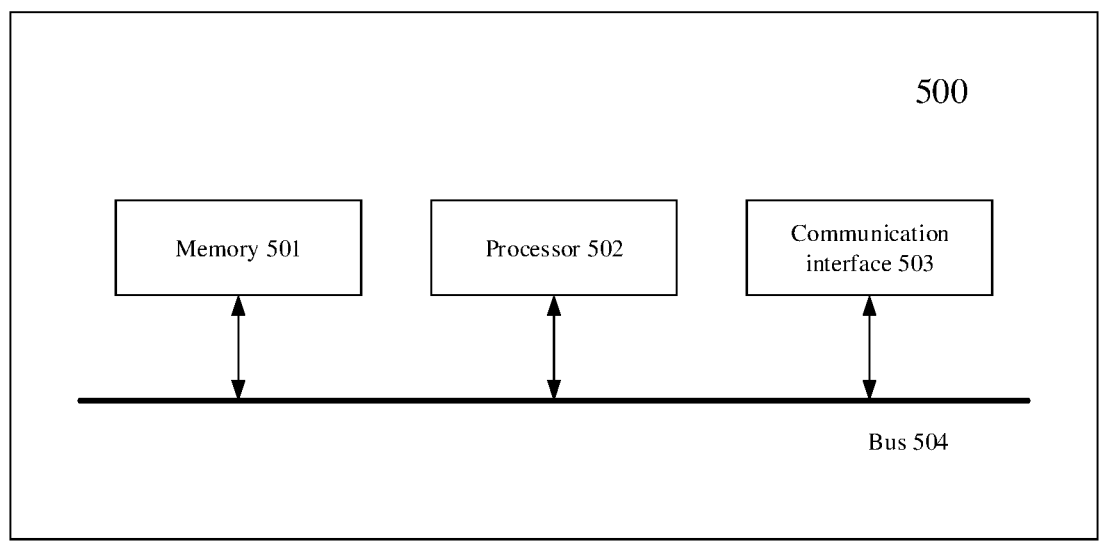
FIG. 9 is a schematic structural view of a device for controlling traffic limitation according to an embodiment of the present application.

The embodiments of the present application further provide a device for controlling traffic limitation. FIG. 9 is a schematic structural view of a device for controlling traffic limitation according to an embodiment of the present application. As shown in FIG. 9, the device 500 for controlling traffic limitation includes a memory 501, a processor 502, and computer programs stored on the memory 501 and executable by the processor 502.

In one example, the processor 502 may include a central processing unit (CPU), an Application Specific Integrated Circuit (ASIC), or one or more integrated circuits configured to implement the embodiments of the present application.

The memory 501 may include a Read-Only Memory (ROM), a Random Access Memory (RAM), a magnetic disk storage medium device, an optical storage medium device, a flash memory device, an electrical, optical or any other physical/tangible memory storage device. Accordingly, the memory generally includes one or more tangible (non-transitory) computer-readable storage media (for example, memory devices) encoded with software which includes computer-executable instructions, and the software, when executed (for example, by one or more processors), is operable to perform operations described with reference to the method for controlling traffic limitation according to the embodiments of the present application.

The processor 502 reads executable program codes stored in the memory 501 and executes computer programs corresponding to executable program codes to implement the method for controlling traffic limitation in the above embodiments.

In one example, the device 500 for controlling traffic limitation may further include a communication interface 503 and a bus 504. As shown in FIG. 9, the memory 501, the processor 502, and the communication interface 503 are connected through the bus 504 and achieve mutual communication therebetween.

The communication interface 503 is mainly configured to achieve communication between various modules, apparatus, units and/or devices in the embodiments of the present application. An input device and/or an output device may also be connected through the communication interface 503.

The bus 504 may include hardware, software, or both of them, and is configured to couple the various components of the device 500 for controlling traffic limitation to each other. As an example, rather than limitation, the bus 504 may include an Accelerated Graphics Port (AGP) or any other graphics bus, an Enhanced Industry Standard Architecture (EISA) bus, a Front Side Bus (FSB), a Hyper Transport (HT) interconnect, an Industry Standard Architecture (ISA) bus, a wireless band interconnect, a Low Pin Count (LPC) bus, memory bus, an Micro Channel Architecture (MCA) bus, a Peripheral Component Interconnect (PCI) bus, a PCI-Express (PCI-E) bus, a Serial Advanced Technology Attachment (SATA) bus, a Video Electronics Standards Association Local Bus (VLB) bus or any other suitable bus or any combination of two or more of the above. When appropriate, the bus 504 may include one or more buses. Although the embodiments of the present application describe and illustrate a particular bus, any suitable bus or interconnect may be considered in the present application.

The embodiments of the present application further provide a computer readable storage medium storing computer program instructions, which, when executed by a processor, to implement the method for controlling traffic limitation according to the above embodiments, and achieve the same technical effects, which will not be repeated here. The computer-readable storage medium may include a non-transitory computer-readable storage medium, such as a Read-Only Memory (ROM), a Random Access Memory (RAM), a magnetic disk or an optical disk, and so on, which is not limited here.

It should be clear that, the embodiments in the specification are described in a progressive way, and the same or similar parts of the respective embodiments may be referred to each other. Each embodiment focuses on differences from other embodiments. For the embodiments of the apparatus, the device, and the computer-readable storage medium, reference can be made to the description of related parts in the embodiments of the method. The application is not limited to the specific steps and structures described above and shown in the figures. A person skilled in the art can make various changes, modifications and additions, or change the order between steps after understanding the gist of the application. Moreover, for the sake of brevity, a detailed description of known methods and technologies is omitted here.

Aspects of the present application are described above with reference to flowcharts and/or block diagrams of methods, devices (systems) and computer program products according to the embodiments of the present application. It should be understood that, each block in the flowcharts and/or block diagrams and a combination of any of blocks in the flowcharts and/or block diagrams may be implemented by computer program instructions. These computer program instructions may be provided to a processor of a general purpose computer, a special purpose computer, or any other programmable data processing apparatus to produce a machine such that execution of the instructions via the processor of the computer or any other programmable data processing apparatus enables implementation of the functions/acts specified in one or more blocks in the flowcharts and/or block diagrams. Such processor may be but is not limited to a general purpose processor, a special purpose processor, an application specific processor, or a field programmable logic circuit. It should also be understood that, each block in the block diagrams and/or the flowcharts and a combination of any of blocks in the block diagrams and/or the flowcharts may be implemented by special purpose hardware that performs specified functions or actions, or by a combination of the special purpose hardware and computer instructions.

A person skilled in the art should understand that, the embodiments are all illustrative rather than restrictive. Different technical features recited in different embodiments can be combined to achieve beneficial effects. A person skilled in the art should be able to understand and implement other modified embodiments of the disclosed embodiments on the basis of studying the drawings, the description, and the claims. In the claims, the term "comprising" does not exclude other devices or steps, the numeral word "a/an" does not exclude a plurality of the involved items; the terms "first" and "second" are used to indicate names and not to indicate any particular order. Any reference signs in the claims should not be construed as limiting the protection scope. The functions of several parts recited in the claims can be implemented by a single hardware or software module. Some technical features are recited in different dependent claims, but it does not mean that these technical features cannot be combined to obtain beneficial effects.

What is claimed is:

1. A method for controlling traffic limitation, comprising:
   acquiring, in response to detecting presence of a present request, a first timestamp of the present request;
   retrieving a pre-created instance of a traffic limitation program, the instance of the traffic limitation program comprising N storage blocks, a total number of instance requests, a traffic limitation request threshold number, an identifier of a storage block for a previous request, a second timestamp of the previous request and request waiting time, wherein the N storage blocks correspond to N sub-time segments which are formed by dividing a pre-set unit time length respectively, where N is an integer greater than 1, and each of the storage blocks stores a number of requests within the respective sub-time segment corresponding to the storage block, and the total number of instance requests is a sum of respective numbers of requests stored in the respective storage blocks;
   updating the pre-created instance of the traffic limitation program based on a time interval between the first timestamp and the second timestamp, the unit time length and the traffic limitation request threshold number; and
   determining whether to perform traffic limitation based on the request waiting time in the updated instance of the traffic limitation program.

2. The method according to claim 1, wherein the updating the instance of the traffic limitation program based on the time interval between the first timestamp and the second timestamp, the unit time length and the traffic limitation request threshold number comprises:
   increasing the total number of instance requests by 1 under a condition that the time interval is less than or equal to the unit time length;
   determining a first target sub-time segment to which the first timestamp belongs and a second target sub-time segment to which the second timestamp belongs based on the first timestamp and the second timestamp;
   replacing the identifier of the storage block for the previous request with an identifier of a storage block corresponding to the first target sub-time segment; and
   updating the total number of instance requests, the number of requests stored in each of the storage blocks and the request waiting time based on the first target sub-time segment, the second target sub-time segment and the traffic limitation request threshold number; and
   replacing the second timestamp with the first timestamp.

3. The method according to claim 2, wherein the updating the total number of instance requests, the number of requests stored in each of the storage blocks and the request waiting time based on the first target sub-time segment, the second target sub-time segment and the traffic limitation request threshold number comprises:
   increasing the number of requests stored in the storage block corresponding to the first target sub-time segment by 1 under a condition that the first target sub-time segment is equal to the second target sub-time segment;
   keeping the number of requests stored in respective storage blocks other than the storage block corresponding to the first target sub-time segment and the total number of instance requests unchanged; and
   updating the request waiting time based on the traffic limitation request threshold number and the updated total number of instance requests.

4. The method according to claim 3, wherein the updating the request waiting time based on the traffic limitation request threshold number and the updated total number of instance requests comprises:
   updating the request waiting time to be 0 under a condition that the updated total number of instance requests is less than the traffic limitation request threshold number, and
   updating, under a condition that the updated total number of instance requests is greater than or equal to the traffic limitation request threshold number, the request waiting time to be a sum of time lengths of m sub-time segments, where m is a positive integer.

5. The method according to claim 4, wherein the updating the request waiting time to be the sum of the time lengths of the m sub-time segments comprises:
   subtracting the number of requests stored in storage blocks which correspond to sub-time segments after the first target sub-time segment, a first sub-time segment to the first target sub-time segment in the order from the updated total number of instance requests, until the total number of instance requests is reduced to be less than the traffic limitation request threshold number; and
   determining a number of storage blocks corresponding to the respective number of requests which are subtracted in the order as the m; and
   updating the request waiting time to be the sum of time lengths of the respective m sub-time segments.

6. The method according to claim 2, wherein the updating the total number of instance requests, the number of requests stored in each of the storage blocks and the request waiting time based on the first target sub-time segment, the second target sub-time segment and the traffic limitation request threshold number comprises:

subtracting, under a condition that the first target sub-time segment is not equal to the second target sub-time segment and the first target sub-time segment is located after the second target sub-time segment, a sum of numbers of requests stored in first invalid storage blocks from the total number of instance requests to obtain the updated total number of instance requests, wherein the first invalid storage blocks comprise storage blocks corresponding to sub-time segments between the first target sub-time segment and the second target sub-time segment and the storage block corresponding to the first target sub-time segment;

increasing the number of requests stored in the storage block corresponding to the first target sub-time segment by 1; and updating the request waiting time based on the traffic limitation request threshold number and the updated total number of instance requests.

7. The method according to claim 6, wherein the updating the request waiting time based on the traffic limitation request threshold number and the updated total number of instance requests comprises:

updating the request waiting time to be 0 under a condition that the updated total number of instance requests is less than the traffic limitation request threshold number, and updating, under a condition that the updated total number of instance requests is greater than or equal to the traffic limitation request threshold number, the request waiting time to be a sum of time lengths of m sub-time segments, where m is a positive integer.

8. The method according to claim 2, wherein the updating the total number of instance requests, the number of requests stored in each of the storage blocks and the request waiting time based on the first target sub-time segment, the second target sub-time segment and the traffic limitation request threshold number comprises:

subtracting, under a condition that the first target sub-time segment is not equal to the second target sub-time segment and the first target sub-time segment is located before the second target sub-time segment, a sum of numbers of requests stored in second invalid storage blocks from the total number of instance requests, wherein the second invalid storage blocks comprise storage blocks corresponding to all sub-time segments after the second target sub-time segment, storage blocks corresponding to all sub-time segments before the first target sub-time segment and the storage block corresponding to the first target sub-time segment;

increasing the number of requests stored in the storage block corresponding to the first target sub-time segment by 1; and updating the request waiting time based on the traffic limitation request threshold number and the updated total number of instance requests.

9. The method according to claim 8, wherein the updating the request waiting time based on the traffic limitation request threshold number and the updated total number of instance requests comprises:

updating the request waiting time to be 0 under a condition that the updated total number of instance requests is less than the traffic limitation request threshold number, and updating, under a condition that the updated total number of instance requests is greater than or equal to the traffic limitation request threshold number, the request waiting time to be a sum of time lengths of m sub-time segments, where m is a positive integer.

10. The method according to claim 1, wherein the updating the instance of the traffic limitation program based on the time interval between the first timestamp and the second timestamp, the unit time length and the traffic limitation request threshold number comprises:

updating the total number of instance requests to be 1 under a condition that the time interval is greater than the unit time length;

determining, for the first timestamp, a first target sub-time segment to which the first timestamp belongs;

replacing the identifier of the storage block for the previous request with an identifier of a storage block corresponding to the first target sub-time segment; and updating the number of requests stored in the storage block corresponding to the first target sub-time segment to be 1, and updating both the number of requests stored in respective storage blocks corresponding to respective sub-time segments other than the first target sub-time segment and the request waiting time to be 0; and replacing the second timestamp with the first timestamp.

11. The method according to claim 1, further comprising:

comparing the time interval with the request waiting time under a condition that the time interval is less than or equal to the unit time length and the request waiting time is greater than 0; and calculating and feeding back, under a condition that the time interval is less than the request waiting time, a difference between the request waiting time and the time interval.

12. The method according to claim 1, the method further comprising:

before retrieving the instance, in response to detecting presence of the present request and acquiring the first timestamp of the present request, creating the instance of the traffic limitation program based on a pre-determined traffic limitation request threshold number and a pre-determined requested traffic limitation accuracy, wherein the requested traffic limitation accuracy is equal to a time length of the sub-time segment, and the number of requests stored in each of the storage blocks, the total number of instance requests and the request waiting time in the created instance of the traffic limitation program are all initially 0, the identifier of the storage block and the second timestamp of the previous request in the created traffic limitation instance are in respective initial states, and the traffic limitation request threshold number in the created instance of the traffic limitation program is a pre-determined traffic limitation request threshold number.

13. The method according to claim 1, further comprising:

modifying, in response to detecting presence of an instance modification instruction, the instance of the traffic limitation program based on the traffic limitation request threshold number and a requested traffic limitation accuracy in the instance modification instruction, such that a time length of each of the sub-time segments in the modified instance of the traffic limitation program is equal to the requested traffic limitation accuracy in the instance modification instruction, and the traffic limitation request threshold number in the modified instance of the traffic limitation program is equal to the traffic limitation request threshold number in the instance modification instruction.

14. The method according to claim 1, further comprising:
clearing the instance of the traffic limitation program, in response to detecting presence of a traffic limitation end instruction.

15. The method according to claim 1, wherein the identifier of the storage block comprises an index of the storage block.

16. A non-transitory computer-readable storage medium, storing computer program instructions, which, when executed by a processor, implement the method for controlling traffic limitation according to claim 1.

17. A device for controlling traffic limitation, comprising:
a processor; and
a memory storing computer program instructions,
wherein the processor is configured to execute the computer program instructions to implement a method for controlling traffic limitation, the method includes:
acquiring, in response to detecting presence of a present request, a first timestamp of the present request;
retrieving a pre-created instance of the traffic limitation program, the instance of the traffic limitation program comprising N storage blocks, a total number of instance requests, a traffic limitation request threshold number, an identifier of a storage block for a previous request, a second timestamp of the previous request and request waiting time, wherein the N storage blocks correspond to N sub-time segments which are formed by dividing a pre-set unit time length respectively, where N is an integer greater than 1, and each of the storage blocks stores a number of requests within the respective sub-time segment corresponding to the storage block, and the total number of instance requests is a sum of respective numbers of requests stored in the respective storage blocks;
updating the pre-created instance of the traffic limitation program based on a time interval between the first timestamp and the second timestamp, the unit time length and the traffic limitation request threshold number; and
determining whether to perform traffic limitation based on the request waiting time in the updated instance of the traffic limitation program.

\* \* \* \* \*